United States Patent [19]

Okita

[11] Patent Number: 4,737,870

[45] Date of Patent: Apr. 12, 1988

[54] MAGNETIC RECORDING AND REPRODUCING APPARATUS HAVING DISK CENTERING BEARING

[75] Inventor: Masao Okita, Furukawa, Japan

[73] Assignee: Alps Electric Co., Ltd., Japan

[21] Appl. No.: 879,264

[22] Filed: Jun. 27, 1986

[30] Foreign Application Priority Data

Jul. 6, 1985 [JP] Japan ................... 60-102447

[51] Int. Cl.$^4$ .............................................. G11B 5/012
[52] U.S. Cl. ..................................................... 360/97
[58] Field of Search ................................ 360/97–99, 360/133

[56] References Cited

U.S. PATENT DOCUMENTS 4,511,944  4/1985  Saito ........................... 360/97 X
4,581,667  4/1986  Gerfast ........................... 360/97

Primary Examiner—John H. Wolff
Attorney, Agent, or Firm—Guy W. Shoup

[57] ABSTRACT

A magnetic recording and reproducing apparatus including a turntable supported rotatably by ball bearings on a fixed shaft. The turntable is adapted to support a magnetic disk having a central hole at which it is centered with respect to the turntable. The disk is rotatable with the turntable. One of the bearings has an outer ring including a portion projecting from the turntable, and the hole of the disk is engaged about the projecting portion of the outer ring.

6 Claims, 2 Drawing Sheets

PRIOR ART Fig. 4

MAGNETIC RECORDING AND REPRODUCING APPARATUS HAVING DISK CENTERING BEARING

BACKGROUND OF THE INVENTION

1. Field of the Invention

This invention relates to an ultrasmall magnetic recording and reproducing apparatus, such as a still video floppy device in an electronic still camera. More particularly, it relates to the centering of a magnetic disk in any such apparatus.

2. Description of the Prior Art

Referring to FIG. 3, there is shown a disk cartridge which is used in a magnetic recording and reproducing apparatus of the type to which this invention pertains. It comprises a casing 1 having an upper portion 1a and a lower portion 1b which are formed from a hard synthetic resin. A flexible magnetic disk 2 is rotatably housed in the casing 1. The upper and lower portions 1a and 1b of the casing are formed with a window 3 which can be closed by a shutter 4 fitted slidably on the casing 1 and having a substantially channel-shaped cross section. The cartridge also has a central hub 5 formed from a synthetic resin and defining the center of rotation of the disk 2. The upper and lower casing portions 1a and 1b are centrally formed with an opening 6. The hub 5 is rotatable about the center of the opening 6. The hub 5 has a hole 7 in which a part of a magnetic recording and reproducing apparatus can be inserted as will hereinafter be described, and a thin elastic wall 5a formed adjacent to the hole 7. An annular yoke 8 is fitted about the hub 5 as shown in FIG. 4, and the disk 2 is bonded to the yoke 8. Thus, the disk 2, the hub 5 and the yoke 8 form a unitary part.

The disk cartridge is mounted on the driving system of a magnetic recording and reproducing apparatus as shown in FIG. 4. The driving system includes a motor which rotates the disk 2.

The apparatus shown in FIG. 4 includes a base 9 to which a fixed shaft 10 is secured by press fitting at one end thereof. Ball bearings 11 and 12 surround the shaft 10 in a vertically spaced apart relationship from each other and support a rotary driving member 13 rotatably about the shaft 10. A turntable 14 is secured to the driving member 13 and provided with an annular driving magnet 15 on its underside. An insulating plate 16 is secured to the base 9 and carries a driving coil 17 facing the driving magnet 15. The rotary driving member 13, the turntable 14, the magnet 15 and the coil 17 form the driving motor so that the turntable 14 may be rotated about the shaft 10.

A rotor yoke 18 is secured to the lower end of the rotary driving member 13 and an annular FG magnet 19 is provided on the underside of the yoke 18. The base 9 carries a frequency signal generator plate (FG plate) 20 facing the FG magnet 19. If the FG magnet 19 is rotated, a change occurs to a magnetic field and causes the FG plate 20 to generate an inverse electromotive force which is outputted as a frequency signal for controlling the rotation of the driving motor.

The turntable 14 has an upstanding annular wall 14a and an annular magnet 21 is provided within the wall 14a. The magnet 21 is provided for attracting the yoke 8 and securing it on the wall 14a so that the disk 2 may be rotated with the turntable 14. A guide member 22 is attached to the upper end of the shaft 10 and has an upwardly tapered surface 22a.

If the disk cartridge is mounted on the driving system in the magnetic recording and reproducing apparatus, the shutter 4 is opened by a projection provided on the apparatus, though not shown, and exposes a part of the disk 2 through the window 3. If the cartridge is, then, lowered, its casing 1 is positioned in place by a positioning pin not shown. The hub 5 is fitted about the rotary driving member 13 as its hole 7 is guided by the tapered surface 22a of the guide member 22, while the yoke 8 is attracted by the magnet 21 and rests on the turntable 14. The peripheral wall of the hole 7 is held by the elastic wall 5a against the outer peripheral surface of the rotary driving member 13 at three points thereof, whereby the hub 5 is centered relative to the shaft 10. The yoke 8 abuts on the upper end of the wall 14a and is thereby positioned axially of the shaft 10, whereby the disk 2 is positioned in place.

If an electric current is supplied to the coil 17 through a circuit not shown to rotate the rotary driving member 13 and the turntable 14, the disk 2 is also rotated and a desired picture signal is recorded on the disk 2 by a magnetic head not shown, but brought into contact with the disk 2 through the window 3 of the casing 1.

The apparatus as hereinabove described has a number of drawbacks as will hereunder be pointed out:

(1) As the upper end of the rotary driving member 13 is inserted in the hole 7 of the hub 5, the disk 2 fails to be positioned accurately if the thickness of the rotary driving member 13 between its outer surface 13a and the outer ring of the upper ball bearing 11 is not uniform.

(2) Even if the surface 13a may be formed with a uniform outside diameter, it is likely to lose uniformity, resulting in the failure of the disk to be accurately centered, as the ball bearing 11 is press fitted into the upper end of the rotary driving member 13.

(3) A high degree of surface finish accuracy is required of the surface 13a with which the peripheral wall of the hole 7 of the hub 5 is kept in contact when it is lowered. If the surface 13a has a low degree of surface finish accuracy, it damages the hub 5 and disables it to be centered accurately.

(4) A high degree of hardness is required of the surface 13a for the same reason as that stated at (3) above. If it has only a low degree of hardness, it easily gets worn and disables the hub to be accurately centered.

(5) As the surface 13a is located radially outwardly of the ball bearing 11, the outside diameter of the ball bearing 11 is greatly limited. It is necessary to use a small and expensive ball bearing.

In order to avoid these drawbacks, it has been usual to work the rotary driving member 13 with a high degree of accuracy, harden, plate or otherwise treat the outer surface of the rotary driving member 13, or grind the surface 13a again after the ball bearing 11 has been fitted in the rotary driving member 13. All of these methods have, however, the disadvantage of lowering the efficiency of apparatus production and raising its cost.

SUMMARY OF THE INVENTION

It is, therefore, an object of this invention to provide a magnetic recording and reproducing apparatus which is simple in construction, and yet which improves the accuracy of magnetic disk centering.

According to this invention, the outer ring of a ball bearing disposed between a fixed shaft and a turntable is used as a reference surface for centering and has a portion which projects from the turntable, and about which a hub is fitted. This feature improves the accuracy of centering of a magnetic disk relative to the fixed shaft and permits the use of a turntable which has not been made extremely accurately.

BRIEF DESCRIPTION OF THE DRAWINGS

FIG. 4 is a view similar to FIG. 2, but showing a known apparatus.

DETAILED DESCRIPTION OF THE INVENTION

Figure 1:
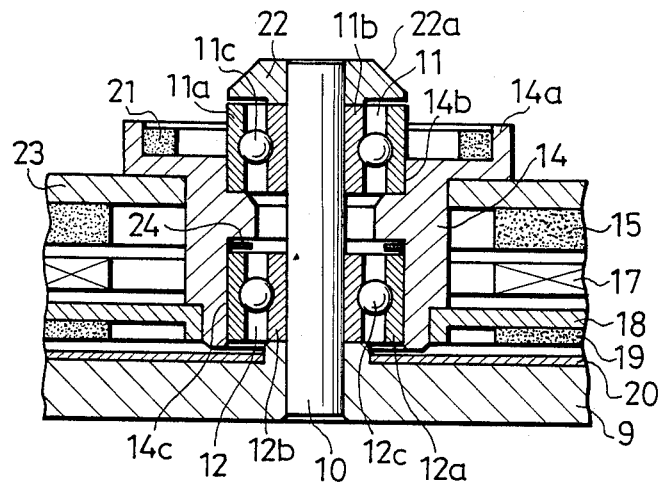
FIG. 1 is a fragmentary vertical sectional view of an apparatus embodying this invention.

Referring to FIG. 1, there is shown a magnetic recording and reproducing apparatus embodying this invention, or more particularly a driving system forming a part thereof. Like numerals are used to designate like or similar parts throughout the drawing figures. A turntable 14 is rotatably supported by an upper ball bearing 11 and a lower ball bearing 12 on a fixed shaft 10 secured to, and upstanding from, a base 9. A flywheel 23 is secured to the turntable 14. An annular driving magnet 15 is provided on the underside of the flywheel 23. A driving coil 17 is provided on the base 9 and faces the magnet 15. The turntable 14, the flywheel 23, the magnet 15 and the coil 17 form a driving moto which rotates the turntable 14 about the shaft 10.

The upper ball bearing 11 is of the known construction and has a plurality of steel balls 11c disposed rollably between an outer ring 11a and an inner ring 11b. The turntable 14 has a shoulder 14b at its top and the outer ring 11a has a lower portion forced into the shoulder 14b, while its upper portion projects upwardly from the turntable 14. The lower ball bearing 12 is also of the known construction and has a plurality of steel balls 12c disposed rollably between an outer ring 12a and an inner ring 12b. The turntable 14 also has a lower shoulder 14c in which the outer ring 12a is fitted, and a wave washer 24 is disposed therebetween.

Figure 2:
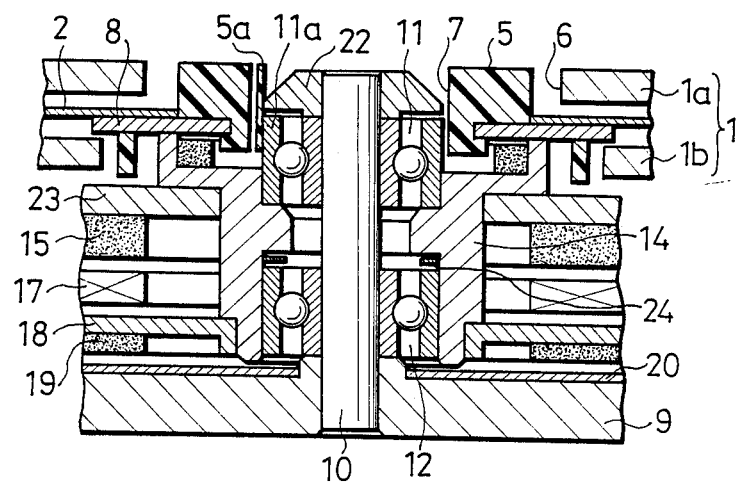
FIG. 2 is a view similar to FIG. 1, but including a disk cartridge mounted in the apparatus.
Figure 3:
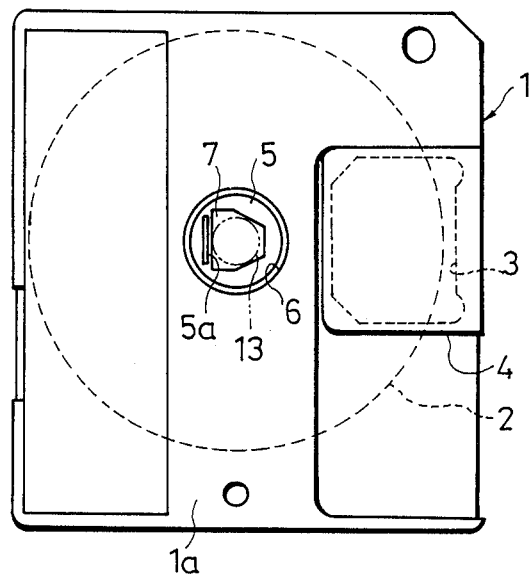
FIG. 3 is a top plan view of the disk cartridge.
Figure 3:
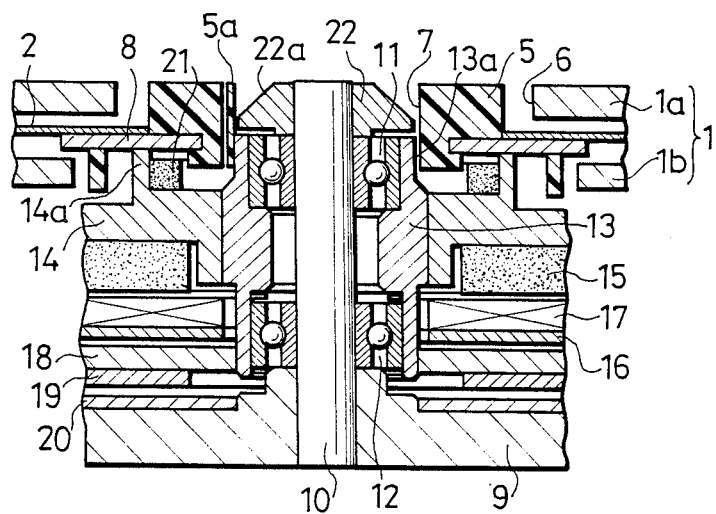

Referring now to FIG. 2, a disk cartridge of the construction shown in FIG. 3 is lowered onto the driving system by a mechanism not shown. The central hub 5 of the magnetic disk 2 is inserted about the outer ring 11a of the upper ball bearing 11 as the peripheral wall of its hole 7 is guided along the tapered surface 22a of the guide member 22. The yoke 8 is attracted by the magnet 21 and rests on the turntable 14. The hub 5 is held by the elastic wall 5a against the outer ring 11a at three points on the peripheral wall of the hole 7 and thereby centered with respect to the shaft 10. The yoke 8 rests on the upper end of the wall 14a upstanding from the turntable 14 and is positioned axially of the shaft 10, whereby the disk 2 is positioned in place.

The apparatus can be placed in operation exactly as has hereinbefore been described with reference to the known apparatus. No repeated description is, therefore, made.

The apparatus as hereinabove described ensures a very high degree of disk centering only if the upper ball bearing 11 is accurately made. The outer ring 11a thereof usually has a hardened and ground surface and is, therefore, excellent in surface accuracy and hardness. It permits the smooth fitting of the hub 5 without doing any appreciable damage thereto.

As the upper ball bearing 11 is located in close proximity to the hub 5, there is no appreciable possibility of the disk 2 failing to be accurately centered, even if the lower ball bearing 12 may not be properly fitted in the turntable 14, particularly due to the presence of the washer 24. Therefore, the lower bearing 12 can be an inexpensive metal bearing which contributes to lowering the cost of apparatus production.

As the hub 5 is directly fitted on the outer surface of the outer ring 11a of the upper ball bearing 11, the outside diameter of the bearing 11 can be increased to the extent limited only by the diameter of the hub hole 7. It is possible to use a ball bearing which is larger in diameter and less expensive than what is required for the known apparatus.

Although the magnetic disk has been described as being rotated by the driving force produced by the mechanism of which the turntable per se forms a part, this invention is also applicable to an apparatus of the type employing a separate motor and a belt or like transmitting means for rotating the turntable.

What is claimed is:

1. In a magnetic recording and reproducing apparatus including a turntable supported rotatably by ball-type bearings on a fixed shaft, including an upper bearing having an inner ring fixed on the shaft, a rotatable outer ring, and balls between the two rings, said turntable being adapted to support a magnetic disk on an upper surface thereof, the magneetic disk having a central hole of a standard inner diameter by which it is centered on the turntable, wherein the improvement comprises said upper bearing being dimensioned such that an outer peripheral surface of its outer ring has an outer diameter which substantially fits directly in the standard inner diameter of the central hole of the disk, and at least a portion of said upper bearing projects above the upper surface of the turntable such that a magnetic disk having the standard inner diameter hole becomes centered on the turntable directly by the outer peripheral surface of the outer ring of said projecting upper bearing without the need for an intervening driving member.

2. An apparatus as set forth in claim 1, wherein said disk is disposed in a casing provided with a central hub through which said hole is formed.

3. An apparatus as set forth in claim 2, further including a flywheel attached to said turntable.

4. An apparatus as set forth in claim 1, wherein said turntable has an annular shoulder in which said outer ring is fitted, and from which said portion projects.

5. An apparatus as set forth in claim 4, further including a flywheel attached to said turntable.

6. An apparatus as set forth in claim 1, further including a flywheel attached to said turntable.

* * * * *